United States Patent [19]

Aichelmann, Jr. et al.

[11] Patent Number: 4,617,664
[45] Date of Patent: Oct. 14, 1986

[54] ERROR CORRECTION FOR MULTIPLE BIT OUTPUT CHIPS

[75] Inventors: Frederick J. Aichelmann, Jr., Hopewell Jct.; Lawrence K. Lange, Wappingers Falls, both of N.Y.

[73] Assignee: International Business Machines Corporation, Armonk, N.Y.

[21] Appl. No.: 626,276

[22] Filed: Jun. 29, 1984

[51] Int. Cl.[4] .............................................. G06F 11/10
[52] U.S. Cl. ..................................................... 371/38
[58] Field of Search ....................... 371/37, 38, 39, 40, 371/68, 69, 3

[56] References Cited

U.S. PATENT DOCUMENTS

| | | | |
|---|---|---|---|
| 4,030,067 | 6/1977 | Howell, et al. | 371/37 |
| 4,168,486 | 9/1979 | Legory | 371/37 |
| 4,211,997 | 7/1980 | Rudnick | 371/38 |
| 4,317,201 | 2/1982 | Sedalis | 371/38 |
| 4,345,328 | 8/1982 | White | 371/38 |
| 4,353,391 | 10/1982 | Alsop, IV | 371/37 |
| 4,488,302 | 12/1984 | Ahamed | 371/40 |
| 4,507,783 | 3/1985 | Austin | 371/49 |
| 4,531,213 | 7/1985 | Scheuneman | 371/3 |

OTHER PUBLICATIONS

Fault-Tolerant Design Techniques for Semiconductor Memory Applications, IBM Journal of Research & Development, vol. 28, No. 2, Mar. 1984, pp. 177-183, F. J. Aichelmann, Jr.

Primary Examiner—Michael R. Fleming
Attorney, Agent, or Firm—Sughrue, Mion, Zinn, Macpeak and Seas

[57] ABSTRACT

An error correction code, especially suited for memory chips with multi-bit outputs, in which parity bits are calculated for each byte of the word and check bits are calculated for the word as a whole. In a 4-byte, 32-bit word, eight bits of error correction can correct up to four errors if the errors are restricted to corresponding bits in the 4 bytes.

11 Claims, 12 Drawing Figures

| PARITY BITS LOCATION TO BE CORRECTED \ ERROR SIGNAL | 1 | 2 | 3 | 4 | 1 2 | 1 3 | 1 4 | 2 3 | 2 4 | 3 4 | 1 2 3 | 1 2 4 | 1 3 4 | 2 3 4 | 1 2 3 4 |
|---|---|---|---|---|---|---|---|---|---|---|---|---|---|---|---|
| 1 | 1 | 2 | 4 | 8 | 3 | 5 | 9 | 6 | 10 | 12 | 7 | 11 | 13 | 14 | 15 |
| 2 | 2 | 4 | 9 | 1 | 6 | 11 | 3 | 13 | 5 | 8 | 15 | 7 | 10 | 12 | 14 |
| 3 | 5 | 10 | 1 | 2 | 15 | 4 | 7 | 11 | 8 | 3 | 14 | 13 | 6 | 9 | 12 |
| 4 | 8 | 1 | 2 | 6 | 9 | 10 | 14 | 3 | 7 | 4 | 11 | 15 | 12 | 5 | 13 |
| 5 | 4 | 3 | 10 | 15 | 7 | 14 | 11 | 9 | 12 | 5 | 13 | 8 | 1 | 6 | 2 |
| 6 | 6 | 12 | 14 | 3 | 10 | 8 | 5 | 2 | 15 | 13 | 4 | 9 | 11 | 1 | 7 |
| 7 | 7 | 11 | 5 | 10 | 12 | 2 | 13 | 14 | 1 | 15 | 9 | 6 | 8 | 4 | 3 |
| 8 | 15 | 13 | 8 | 14 | 2 | 7 | 1 | 5 | 3 | 6 | 10 | 12 | 9 | 11 | 4 |

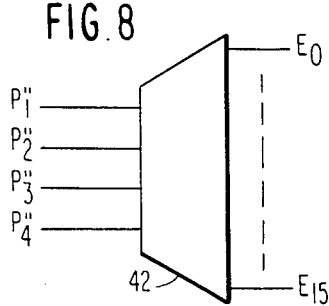
FIG. 8
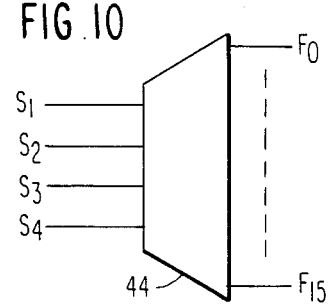
FIG. 10
FIG. 9
| $E_n$ | $P_1''$ | $P_2''$ | $P_3''$ | $P_4''$ |
|---|---|---|---|---|
| n = 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |
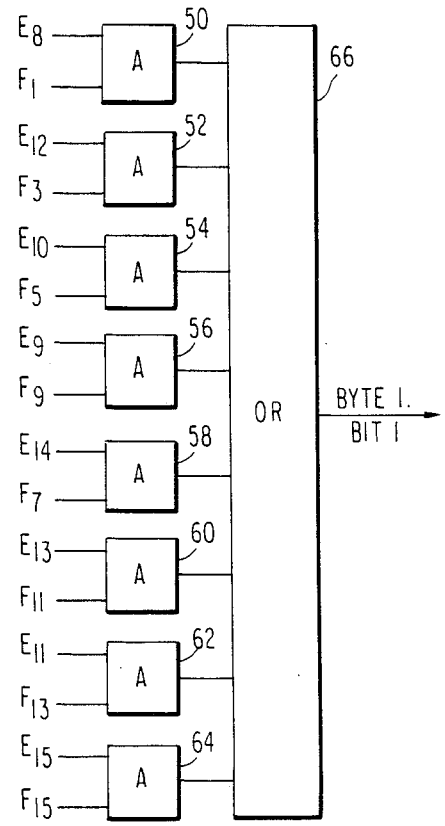
FIG. 11
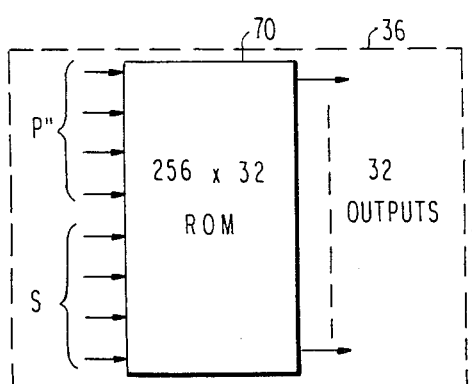
FIG. 12

ERROR CORRECTION FOR MULTIPLE BIT OUTPUT CHIPS

BACKGROUND OF THE INVENTION

The invention relates generally to error correction codes and, in particular, it relates to error correction codes optimized for memory chips that have multiple bit outputs.

In recent years, computer systems have been designed and built with ever increasing size, particularly in their memory capabilities. However, the cost of these larger computer systems have remained constant or even decreased because of the use of VLSI memory chips. More bits of memory can be packed on a VLSI chip for much the same cost as much smaller chips of previous generation memory chips. The increased memory size has not been accomplished without additional problems however. With the increased number of memory bits, reliability has become a severe problem. No longer can the occasional failure of a memory bit be allowed to cause the system to crash or become inoperative. The multiplicity of memory bits is too large and the overall probability of failure too high to permit the failure of a single bit or a single chip to render the computer system inoperative until the offending chip is replaced. Furthermore, a VLSI memory chip is more prone to errors because of the markedly reduced size of the individual components of the memory elements. That is, the increased complexity of modern memory systems has been purchased at the cost of decreased reliability of the memory components.

One solution to the reliability problem has been the increasing use of error correction codes (ECC). An example of ECC is provided by Kustedjo et al in U.S. Pat. No. 4,360,916. ECC provides the capability of correcting occasional errors that occur in memory chips. For instance, if Hamming ECC is used, eight additional bits of check code can detect and correct a single bit of error in a 32 bit data word. A Hamming code is very effective for isolated soft errors, that is, the random reversal of bits in a memory. The occasional occurrence of a bit reversal can be thus corrected and the probability of a bit reversal is so low that the joint probability of two reversals in a single 32 bit word becomes vanishingly small. The Hamming type of ECC is also useful for hard errors or permanent errors in which a isolated bit of memory becomes permanently inoperative. The code provides the capability of correcting this single error.

Error correction codes incur a relatively small penalty in memory space as long as only a single error is required to be corrected. For soft errors, this condition is generally satisfied. In large computer systems, separate memory chips are usually provided for each bit of a word. For instance, if a 64 bit word length is being used, there are 64 separate memory chips, one chip per word. If one chip goes bas, so that its output becomes unreliable, ECC in large systems can dramatically increase the overall reliability of the memory system against hard failures.

In smaller systems, however, the situation is somewhat different. Because the memory requirements of a smaller computer system are usually rather small, it is typical to use memory chips that have multi-bit outputs. That is, more than one bit of the typical data word is stored on a single memory chip. For instance, a total of 8 memory chips, each having a 4 bit output, can be used for storing a 32 bit data word. The data space may be small enough and the individual memory chips big enough that a single bank of 4-bit wide data chips may be sufficient to support the memory requirements of the system. The difficulty with ECC in such a system is that one entire memory chip may go bad, with the result that the 4 bits contributed by that chip become unreliable. The error correction code required to provide reasonable reliability in such a system thus must be able to correct at least 4 errors in a 32 bit word. Although such error correction codes are available, they incur a substantial memory size penalty. Needless to say, smaller computer systems are cost sensitive and additional memory necessary to support effective error correction for multi-bit output memory chips is inconsistent with the design philosophy of a smaller computer system. Furthermore, error correction codes that can correct large number of errors in a single data word usually incur a computational penalty that would degrade the performance of the computer system.

SUMMARY OF THE INVENTION

Accordingly, it is an object of this invention to provide a method of error correction that is optimized for the possibility of failure of a memory chip providing multiple bits to a data word.

It is a further object of this invention to provide error correction that is simple and uses a small number of check bits.

The invention can be summarized as an error correction code for a multi-bit word of memory in which a parity bit is generated for each word and in which additional error correction bits are provided to correct at least one corresponding bit in each byte. The parity bits indicate which of the bytes have the incorrect bit.

Furthermore the check bits can be shared among multiple words as long as only one word needs to have its bits corrected.

BRIEF DESCRIPTION OF THE DRAWINGS

FIG. 8 is a representation of a selector usable in the bit error locator of this invention.

FIG. 9 is a table relating the inputs to the outputs for the selector of FIG. 8.

FIG. 10 is a representation of another selector usable in the bit error locator.

FIG. 11 is a logic circuit diagram for a portion of the bit error location.

FIG. 12 is a representation of a read-only memory usable in another embodiment of the bit-error locator.

DETAILED DESCRIPTION OF THE PREFERRED EMBODIMENTS

Figure 1:
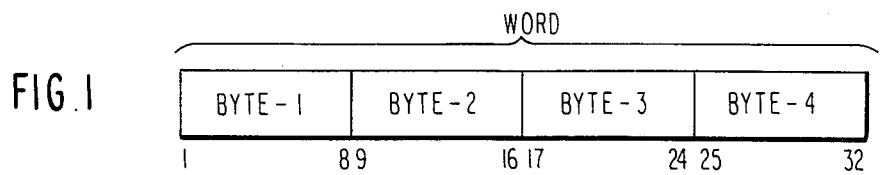
FIG. 1 is an illustration of the format of a data word.

FIG. 1 is an illustration of a typical data word for small size computer. The word consists of 4 bytes and each byte consists of 8 binary bits. Thus the illustrated word consists of 32 bits. Larger words are common in large computer systems and smaller words are found in some small computers, such as microcomputers.

The typical memory architecture assigns one memory chip to each bit of the data word. In the illustrated example, there would thus be 32 memory chips for a single bank of memory. If the memory chips being used have a capacity of 256K (262,144 binary bits), then the 32 memory chips would provide 256K 32-bit words.

Figure 2:
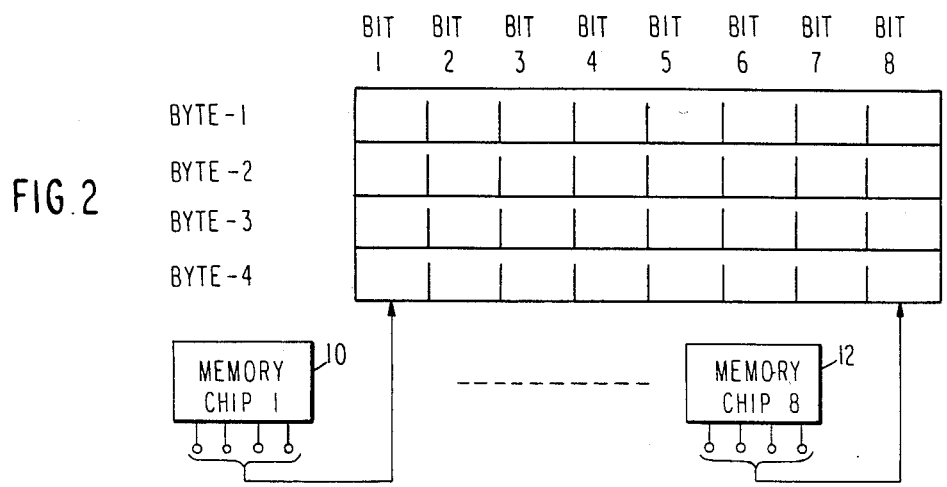
FIG. 2 is an illustration of the format of a data word and its relationship to the memory chips in which it is contained.

A smaller computer system may not have the need for this total amount of storage and therefore the memory chips are likely to have a different architecture. In this case, the same size 256K memory chip is designed with multiple parallel outputs, for example, 4 outputs. This kind of a chip is commonly called a 64K×4 memory chip. When a particular address on the memory chip is accessed, 4 bits of data are simultaneously read from or written on the 4 parallel outputs. The relationship between the data word and the memory chips is illustrated in FIG. 2. The 4 bytes of the data word can be considered to be in parallel and separate memory chips 10 and 12 store the corresponding bits for each of the 4 bytes. There are thus required only 8 memory chips 10 and 12 to accommodate the 32 bit data word. Of course, the storage capacity for such a bank of 64K×4 memory chips 10 and 12 is only 64K. For a small computer system, 64K of memory may be sufficient.

The difficulty with this memory architecture is that error correction becomes much more difficult. A common mode of failure is for one of the memory chips 10 and 12 to go bad with the result that all 4 of its outputs become unreliable. This means that it is likely that there will be 4 bad bits in the 32 bit data word, unlike the case in a larger system where only 1 bit in the data word is associated with a particular memory chip. The difficulties of applying ECC to multi-bit output chips and some remedies are described by one of the inventors, Aichelmann, in a technical article entitled "Fault-Tolerant Design Techniques for Semiconductor Memory Applications", appearing in the IBM Journal of Research and Development, vol. 28, no. 2, March 1984 at pages 177–183. Error correction codes for detecting and correcting 4 bits are available but they are memory intensive and do not account for the fact that the multiple errors are likely to occur on the bits stored in the same memory chip.

According to the invention, separate parity bits are provided by each of the bytes of the data word and additional check bits are provided for error correction. The check bits, in conjunction with the parity bits, can detect and correct one to four errors, as long as the errors are restricted to the corresponding bit in the separate bytes making up the data word. Furthermore, the parity bits can detect a large fraction of multiple bit errors although the errors may be uncorrectable.

Figure 3:
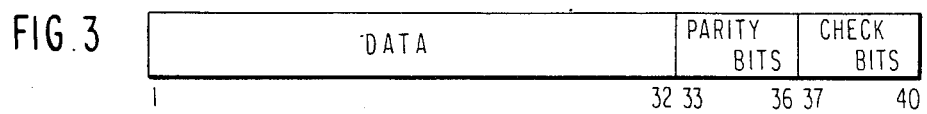
FIG. 3 is an illustration of the format of one data word of this invention.

The format for the error correction code (ECC) for one embodiment of the invention is illustrated in FIG. 3 for a 4-byte, 32-bit data word. It is to be understood, of course, that the invention is not limited to the provided example. The error correction code includes 4 parity bits and 4 check bits to provide error detection and correction for the 32 bits of data. Of course, additional memory needs to be provided for the parity bits and the check bits. It is seen that the memory architecture of FIG. 2 can be extended to include one additional memory chip for the parity bits and another additional memory chip for the check bits.

The use of parity bits is well known in digital systems. A parity bit covering a multi-bit data word is generated by adding the multiple bits of the data word in modulo 2 arithmetic. For instance, if there are an even number of 1s in the data word, the parity bit is 0 and if there are odd number of 1s the parity bit is 1. The precise convention for parity in this invention is not an important factor. The parity bit is stored with the data word from which it is generated. When the data word is read, the parity bit is recomputed and compared with the stored parity bit. Of course, if the stored and recomputed parity bits do not agree, there has been an error in memory. A parity bit can only detect an error but cannot correct it. Furthermore, a single parity bit is incapable of detecting even multiples of errors because if two data bits are inverted, the same parity bit is produced. The simultaneous use of both a parity bit and check bits is disclosed by Alsop in U.S. Pat. No. 4,355,391, by Howell et al. in U.S. Pat. No. 4,030,067 and by Legory in U.S. Pat. No. 4,168,486. However all these references disclose the parity bit covering the same length word as the associated check bits.

In the described embodiment of the invention, each of the 4 parity bits cover one 8-bit byte. Thus the 4 parity bits are used to indicate which of the 4 bytes of data in the data word contain errors. Blocking of data words for ECC has been described by Patel in U.S. Pat. No. 3,913,068 and by Bahl et al. in U.S. Pat. No. 4,291,406. However these references described error correction of a stream of serial data rather than parallel data from RAM memory.

The 4 check bits are used to correct the entire 32 bit data word, once an error has been detected. The correction is done using the parity bits as an integral part of the error correction code.

Before the error correction code is described in detail, the general concepts of ECC will be described. If the data word is represented by a vector [W] and the 4 check bits are represented by another vector [C], the ECC is defined by an H matrix that transforms the word into the check bits, that is, $[H] \cdot [W] = [C]$. The addition required in the matrix multiplication is performed in modulo 2 so that only the last significant bit is retained. When the matrices and vector have single bit elements, the modulo 2 addition can be performed by an exclusive OR gate. It is to be noted that the H matrix is non-square since it transforms the 32-bit word vector into a 4-bit check bit vector or possibly an 8-bit combined check and parity bit vector. It is to be further noted that the ECC described here is a separable code so that the original data word is not itself changed when it is being stored in correctable form. As a result, the stored data word can be read separately from the stored ECC. When the data word is read as a vector [W'] that may possibly differ from the originally stored vector [W] because of bit errors, a new set of check bits is generated, that is, $[H] \cdot [W'] = [C']$. The difference between the two sets of check bits is called the syndrome, $[S] = [C'] - [C]$. A non-zero syndrome in any of its bits, indicates that there has been a bit error and the combination of the syndrome bits can be used to indicate which of the bits in the data word is in error.

Figure 4:
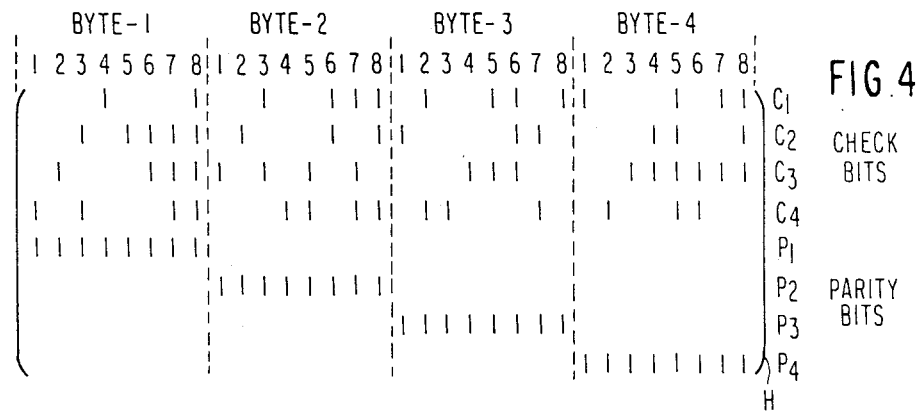
FIG. 4 is a representation of an H matrix usable with the error correction code of this invention.

An H matrix suitable for the practice of this invention is illustrated in FIG. 4. Only non-zero elements are shown in FIG. 4. The illustrated H matrix can be used to generate both the check bits $C_1$-$C_4$ as well as the parity bits $P_1$-$P_4$.

In reality, the combination of the check bits and the parity bits is an 8-bit ECC although the parity bits can be easily calculated by simpler means.

The H matrix of FIG. 4 is used to generate the stored check bits and parity bits and is also used to generate the check bits and parity bits generated from the data word read from memory. The syndrome bits are the difference between the check bits in the two sets, for example, $S_1 = C_1' - C_1$. A parity bit error signal is the difference between the parity bits in the two sets, for example, $P_1'' = P_1' - P_1$. A non-zero parity bit signal indicates an error in the corresponding byte.

Figures 5, 7:
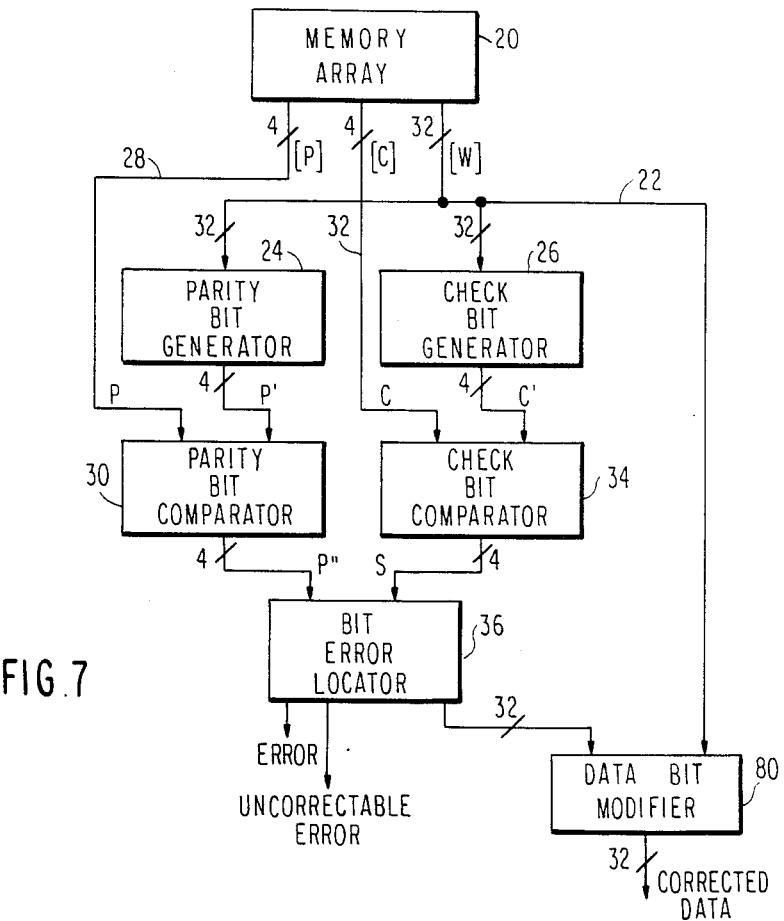
FIG. 5 is a table used to point to erroneous bits and is usable with the H matrix of FIG. 5.
FIG. 7 is a block diagram of a system for using the error correction of this invention.

The syndrome bits are used to point to the bit locations that have suffered bit reversals between the two uses of the H matrix. The parity bit error signals are used both to point to the particular bytes having the error and are also used in conjunction with the syndrome bits in the ECC. A table of bad bit locations is illustrated in FIG. 5 that corresponds to the H matrix of FIG. 4. The columns are labelled with the parity bit error signals pointing to the bytes containing errors. The body of the table denotes the values of the syndrome bits. In particular, a listed value is a weighted sum of the individual syndrome bits $S = 8S_1 + 4S_2 + 2S_3 + S_4$. This weighted sum is performed simply for ease of presentation of the table and a corresponding table could be easily generated listing the separate values of the syndrome bits. The rows are labelled by the bit location which is to be corrected, that is, that contains an inverted bit value. The use of look-up tables is disclosed by Sery in U.S. Pat. No. 4,358,849 and by Kustedjo et al in the previously cited patent.

The table of FIG. 5 is used in the following manner. The original parity bits are compared with the newly generated parity bits to produce the parity bit error signals P", which point to the bytes in the word which are indicated to have errors. Then the column is used that is labelled by the parity bit error signals. The various entries of that column are compared with the value of the syndrome bits and a matching value of S indicates the bit location that needs to be corrected. The bit location is corrected in whichever bytes the parity bit error signals indicate have errors. It is to be noted that for any particular column there are values of the syndrome S which are not listed. These values of the syndrome indicate that there is an error but that the error is an uncorrectable error. It is further noted that this error correction code is usable for correction only when a single bit location, in possibly multiple bytes, is in error. If different bit locations are simultaneously in error, the illustrated example of ECC cannot correct the errors. However, the illustrated ECC can correct multiple errors in a word if those errors are restricted to the corresponding bits in the different bytes. Referring to FIG. 2, it can be seen that since the corresponding bits of the different bytes originate from the same memory chip 10 and 12, multiple errors are most likely to occur in the corresponding bits.

The illustrated example of ECC of the invention does not provide a self-protecting ECC, that is, if the parity bits or the check bits are in error, these errors cannot be corrected. However, this is not as serious drawback as may first appear. If only the check bits are in error, the parity bits would not indicate an error and an error correction would not be attempted. If only the parity bits are in error, the syndrome bits would all be zero. This combination could be held to indicate no error in the data word since zero values for all the syndrome bits are not included in Table 5. It would be possible to extend the ECC of the invention to cover the correction of the parity and check bits. However, this would require additional checking bits and the increased memory requirements are inconsistent with the simplicity required for a small computer system.

Figure 6:
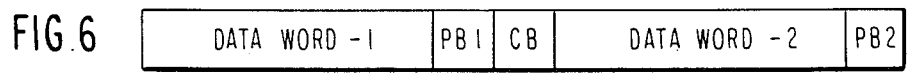
FIG. 6 is an illustration of the format of a double data word in another embodiment of this invention.

In another embodiment of the invention, multiple data words share a single set of check bits. Such check bit sharing is important in small computer systems because it allows the reduction in memory allocated to the storage of check bits. The format for the second embodiment is illustrated in FIG. 6 for two data words with each data word consisting of four 8-bit bytes. Separate sets of parity bits PB1 and PB2 are generated and stored for each data word. As a result, the 8 parity bits are assigned to different bytes of the two data words, just as in the first embodiment. However, the check bits are shared between the data words in the following manner. The check bits are generated using the H matrix of FIG. 4 but the check bits are not generated from the individual data words. Instead, another word is generated by an exclusive OR of the two data words. This is equivalent to a modulo 2 addition of the two data words. The H matrix is applied to the exclusive OR word, insofar as the check bits are concerned. However, the parity bits are separately generated from the two respective data words.

When a data word is read from memory, new parity bits are calculated for each bit of that word. If no parity error is detected, the data word is assumed to be error free. However, if any of the newly generated parity bits differ from the stored parity bits, an error is thereby indicated and a correction routine is entered. The other data word is then read from memory and an exclusive OR of the two words is taken and new check bits are generated from the exclusive OR word. The syndrome bits are obtained by differencing the new and the old check bits. The table of FIG. 5 is then used to point to the bit location which are in error and the parity bits point to the bytes which are in error. It is to be appreciated, of course, that if the parity bits indicate that there are errors in both data words, then the shared check bits are not capable of correcting the errors. Instead, an uncorrectable error is thereby indicated.

The concept of shared bits can be extended to more than two data words. Each data word would have its own set of parity bits. The check bits, however, are generated from a modulo 2 addition of the corresponding bits of all the multiple data words. Although the parity bits will indicate the presence of errors in any number of data words, the single set of check bits are effective at correcting errors only if the errors are restricted to corresponding bits in the bytes of a single data word. However, if separate memory chips are being used for multiple data words, there is a low probability that two different memory chips will produce errors in multiple words. A somewhat similar scheme is described by Alsop in U.S. Pat. No. 4,355,391 in which both the parity bit and the check bits are shared by 64 bytes of data. In Alsop's scheme, there is no straightforward indication of which byte has a parity error.

A possible hardware implementation for the error correction code of this invention will now be described with reference to FIG. 7. A memory array 20 is composed of the memory chips for storing one data word and its associated parity and check bits, as illustrated in FIG. 2. A 32-line bus 22 is lead to a parity bit generator 24 and a check bit generator 26. The parity bits are generated by an exclusive OR of all the bits in the 8-bit byte with which the particular parity bit is associated. The check bit generator performs the matrix multiplication of the H matrix with the word vector [W]. This matrix multiplication can be accomplished by taking the AND products of the corresponding elements in the word vector [W] and a row of the H matrix. Then an exclusive OR is performed on all of the products from that row to produce one of the check bits. Such a circuit can be easily realized in a cell array.

The parity bit generator 24 outputs 4 parity bits and the check bit generator 26 outputs 4 check bits. It will be assumed that these or similar circuits had previously been used to generate the check and parity bits previously stored in the memory array 20. The previously generated parity bits are output from the memory array 20 on a four line bus 28 to a parity bit comparator 30 in which they are bit-wise compared with the currently generated parity bits from the parity bit generator 24. The four outputs of the parity bit comparator 30 are the parity bit error signals P'' indicate which of the 4 bytes in the data word W contain a parity error.

The previously generated check bits are output from the memory array 20 on a four line bus 32 and are fed into a check bit comparator 34. The check bit comparator 34 compares the check bits from the memory array with the check bits produced by the check bit generator 26. The comparison is done on a bit-wise basis. The four outputs of the check bit comparator 34 are the syndrome bits S. The parity bit error signals P'' and the syndrome bits S are input to a bit error locator 36 which computes according to the table of FIG. 5 the locations of the bits in the data word W that require correction or inversion.

There are at least two possible implementations for the bit error locator 36. In the first implementation, the four lines bearing the parity bit error signals P'' are lead into a decoder or selector 40 shown in FIG. 8. Depending upon the values of all four of the parity bit error signal lines, one of the 16 output lines $E_0$–$E_{15}$ is high. The table representing the relationship between the values of the parity bit error signals P'' and the 16 signal lines $E_0$–$E_{15}$ is presented in FIG. 9. It should be recognized that this table is simply the binary representation of a hexadecimal number. Similarly, the syndrome bits S are lead on four input lines to another decoder or selector 44 shown in FIG. 10, also having 16 output lines $F_0$–$F_{15}$. The relationship between the input and output values is given by a table similar to that in FIG. 9. It should be recognized that the output line $F_0$–$F_{15}$ that goes high is designated by the syndrome value S in the table of FIG. 5.

It is now required to relate the values of the output lines $E_0$–$E_{15}$ and $F_0$–$F_{15}$ to the locations of the bits and the bytes that require correction. Referring to the table in FIG. 5, the columns correspond to the signals $E_0$–$E_{15}$, according to the correspondence represented in FIG. 9 and the entries in the table are the numberings of the lines $F_0$–$F_{15}$. A particular bit and a particular byte will be indicated to require correction by a number of different combinations of the E and F signals. For instance, an error in the first bit of the first byte can be represented by the equation BYTE1.BIT1 = $E_8F_1$.OR.$E_{12}F_3$.OR.$E_{10}F_5$.OR.$E_9F_9$.OR.$E_{14}F_7$.OR.$E_{13}F_{11}$.OR.$E_{11}F_{13}$.OR.$E_{15}F_{15}$. Similar relationships can be derived for the other 31 bits in the data word by a careful inspection of the table in FIG. 5. This mathematical expression can be electrically realized by use of the logic circuits illustrated in FIG. 11. Eight AND gates 50–64 each have two inputs, one an E line and one an F line with the illustrated ordering of the lines. All of the outputs of the AND gates 50–64 are led to an 8-input OR gate 66. The output of the OR gate 66 is the value BTYE1.BIT1 defined by the above described equation. This output indicates that the first bit in the first byte is an error. There would, of course, need to be a total of 32 circuits similar to that of FIG. 11 to indicate the 32 bits of the data word W. A similar circuit is disclosed in the previously cited Aichelmann article.

An alternative implementation for the bit error locator 36 uses a read-only memory (ROM) 70 illustrated FIG. 12. For a 32-bit data word, the ROM needs to be of a size 256×32, that is 256 independently addressable words, each word having 32 bits. The 8 bits of addressing space for the 256 words are assigned to the parity bit error signals P'' and the syndrome bits S. As a result, each combination of the parity bit error signals and the syndrome bits address a different location. The individual bits of the separately addressable words correspond to a bit of the data word W. The presence of a 1 in a particular bit indicates that that bit in the data word W needs to be corrected. The use of a ROM for ECC is disclosed by Legory in U.S. Pat. No. 4,168,486 and by Sery in U.S. Pat. No. 4,358,849.

The 32 output lines of the bit error locator 36 are led to a data bit modifier 80, as illustrated in FIG. 7. The lines 22 from the memory array 20 are also connected to the data bit modifier 80. The data bit modifier 80 inverts the bits of the data word W indicated by the output of the bit error locator 36. The data bit modifier 80 can be easily realized by 32 exclusive OR gates having as inputs the corresponding lines on the bus 22 and the lines from the bit error locator 36. The output of the data bit modifier 80 is the corrected data.

The bit error locator 36 may have two additional outputs. One output is a single ERROR line indicating that an error has occurred. The ERROR signal can be easily realized by taking a NAND product of the signals $E_0$ and $F_0$. This combination of E and F lines is the only combination that does not denote an error. Another output of the bit error locator 36 is an output for an uncorrectable error. An uncorrectable error occurs for those combinations of the parity bit error signals P and the syndrome S that are not represented in the table of FIG. 5. The ECC can detect that there is an error but it is incapable of correcting the error which is necessarily a multi-bit error. The uncorrectable error output can be realized by a combination of AND gates, the outputs of which are inputs to an OR gates, similarly to the circuit of FIG. 11. Alternatively, the ROM 70 of FIG. 12 could be expanded to a 256×33 ROM with the extra output being the uncorrectable error output.

We claim:

1. A method of error correcting a data word consisting of a plurality of subwords, each subword consisting of a plurality of bits, comprising the steps of:

computing a first set of parity bits, a parity bit being computed from each subword of an original data word;

computing a first set of check bits from said original data word according to an error correction code;

computing a second set of parity bits, a parity bit of said second set being computed from each subword of a data word derived from said original data word, said derived data word consisting of a plurality of subwords, each subword consisting of a plurality of bits;

differencing the corresponding bits of said first and second sets of parity bits to produce a set of parity bit error signals, parity bit error signals not having a predetermined value indicating non-equality between said original data word and said derived data word;

computing a second set of check bits from said derived data word according to said error correction code;

differencing the corresponding bits of said first and second sets of check bits to produce a set of syndrome bits; and computing from said set of parity bit error signals and said set of syndrome bits according to said error correction code the bit locations in which said original data word differs from said derived data word.

2. A method of error correcting as recited in claim 1, wherein each of said original and derived data words consists of four subwords and each subword consists of eight bits.

3. A method of error correcting as recited in claim 2, wherein the steps of computing a set of check bits from a word comprises a multiplication of a matrix with a vector of the bits of said word, said matrix being:

$$\begin{pmatrix} 00010001 & 00100111 & 01001101 & 10001011 \\ 00101111 & 01000101 & 10000110 & 00011001 \\ 01000111 & 10101010 & 00011100 & 00111111 \\ 10100011 & 00011011 & 01100010 & 01001100 \end{pmatrix}$$

4. A method of error correcting as recited in claim 1, wherein:

each of said original and derived data words consists of a plurality of intermediate words, each intermediate word consisting of a plurality of subwords; and said steps of computing a set of check bits comprises:

adding the corresponding bits of said intermediate words to form a first word; and computing said set of check bits from said first word according to said error correction code.

5. A method of error correcting as recited in claim 3, wherein:

each of said original and derived data words consists of a plurality of intermediate words, each intermediate word consisting of a plurality of subwords; and said steps of computing a set of check bits each comprise:

adding the corresponding bits of said intermediate words to form a first word; and computing said set of check bits from said first word according to said error correction code.

6. An error correcting memory system, comprising:

a data bus for a data word, said data word consisting of a plurality of subwords;

a first parity bus for a first set of plurality of parity bits associated with said data word, each parity bit associated with one of the subwords of said data word;

a first check bus for a first set of a plurality of check bits associated with said data word;

a memory array for storing said data word and said first sets of said parity bits and said check bits;

a parity and checking circuit receiving said data word on said data bus and generating a second set of parity bits and a second set of check bits from said data words according to an error correction code, each of said parity bits recording the parity of a separate subword of said data word, said second set of parity bits being output on a second parity bus and said second set of check bits being output on a second check bus;

means receiving said first and second parity busses and said first and second check buses for comparing values on the lines of said first parity bus and said first check bus with the values on the corresponding lines of said second parity bus and said second check bus, said comparing means outputting comparison signals; and means receiving said data word on said data bus and receiving said comparison signals for correcting said data word according to said error correction code and said comparison signals.

7. An error correcting memory system as recited in claim 6, wherein said memory array comprises a plurality of memory chips, each memory chip having a plurality of data outputs, each said output associated with a different subword of said data word.

8. An error correcting memory system as recited in claim 7, wherein said data word consists of four subwords and each subword consists of eight bits an each said memory chip includes four data outputs.

9. An error correcting memory system as recited in claim 8, wherein said memory array includes one memory chip for four bits associated with said data word and another memory chip for four check bits associated with said data word.

10. An error correcting memory system as recited in claim 9, wherein said parity and checking circuit produces said second sets of said parity and check bits according to an error correction code represented by the matrix:

$$\begin{pmatrix} 00010001 & 00100111 & 01001101 & 10001011 \\ 00101111 & 01000101 & 10000110 & 00011001 \\ 01000111 & 10101010 & 00011100 & 00111111 \\ 10100011 & 00011011 & 01100010 & 01001100 \end{pmatrix}$$

11. An error correcting system as recited in claim 6, in which said data word is a derived data word, further comprising:

a parity and check bit generator for generating, according to said error correction code, said first set of parity bits and said first set of check bits from an original data word from which said derived data word is derived, said original data word consisting of the same number of subwords as said derived data word, said parity and check bit generator providing said first set of parity bits to said first parity bus and said first set of check bits to said first check bus.

* * * * *